United States Patent

Breau et al.

[11] Patent Number: 6,161,247
[45] Date of Patent: Dec. 19, 2000

[54] MIRROR CLEANING SYSTEM

[76] Inventors: Tony Breau, 105 - 100TH Ave., Treasure Island, Fla. 33706; Michael Accommando, 1190 20TH St. North, St. Petersburg, Fla. 33713

[21] Appl. No.: 09/562,488

[22] Filed: Apr. 30, 2000

[51] Int. Cl.[7] .................. B60S 1/48; B60S 1/56
[52] U.S. Cl. .................. 15/250.01; 15/250.003; 15/250.29; 15/250.4
[58] Field of Search ......... 15/250.003, 250.002, 15/250.29, 250.24, 250.31, 250.11, 250.001, 250.01, 250.4

[56] References Cited

U.S. PATENT DOCUMENTS

| | | | |
|---|---|---|---|
| 2,893,041 | 7/1959 | Schafer. | |
| 4,212,091 | 7/1980 | Jones | 15/250.003 |
| 5,315,735 | 5/1994 | Shin | 15/250.29 |
| 5,363,236 | 11/1994 | Han | 15/250.003 |

*Primary Examiner*—Gary K. Graham

[57] ABSTRACT

A mirror cleaning system includes a mirror with an exposed front surface and a mirror support assembly. A pair of vertically extending hollow, fiberglass pipes include an interior actuator and an exterior guide secured with respect to the support assembly. A cross piece has interior and exterior end blocks. Each block has a vertical aperture slidably received on the pipes for reciprocal movement upwardly and downwardly along the pipes. An elongated wiper arm of an elastomeric material is positioned in sliding contact with the front surface of the mirror during reciprocation of the cross piece. The interior actuator constitutes a magnetic rodless actuator with an internal magnet movable by air pressure for reciprocating the cross piece and wiper arm with respect to the front surface of the mirror. The interior actuator also includes an upper air line and a lower air line and a source of pressurized air and valve to effect the motion of the magnet. Upper and lower sensors at the opposite ends of the interior actuator function to reverse the air valve and the direction of air flow. When not in operation, the cross piece and wiper arms are at one end of the mirror with no visual impairment so as not to encumber the normal use of the mirror for maximum safety.

4 Claims, 3 Drawing Sheets

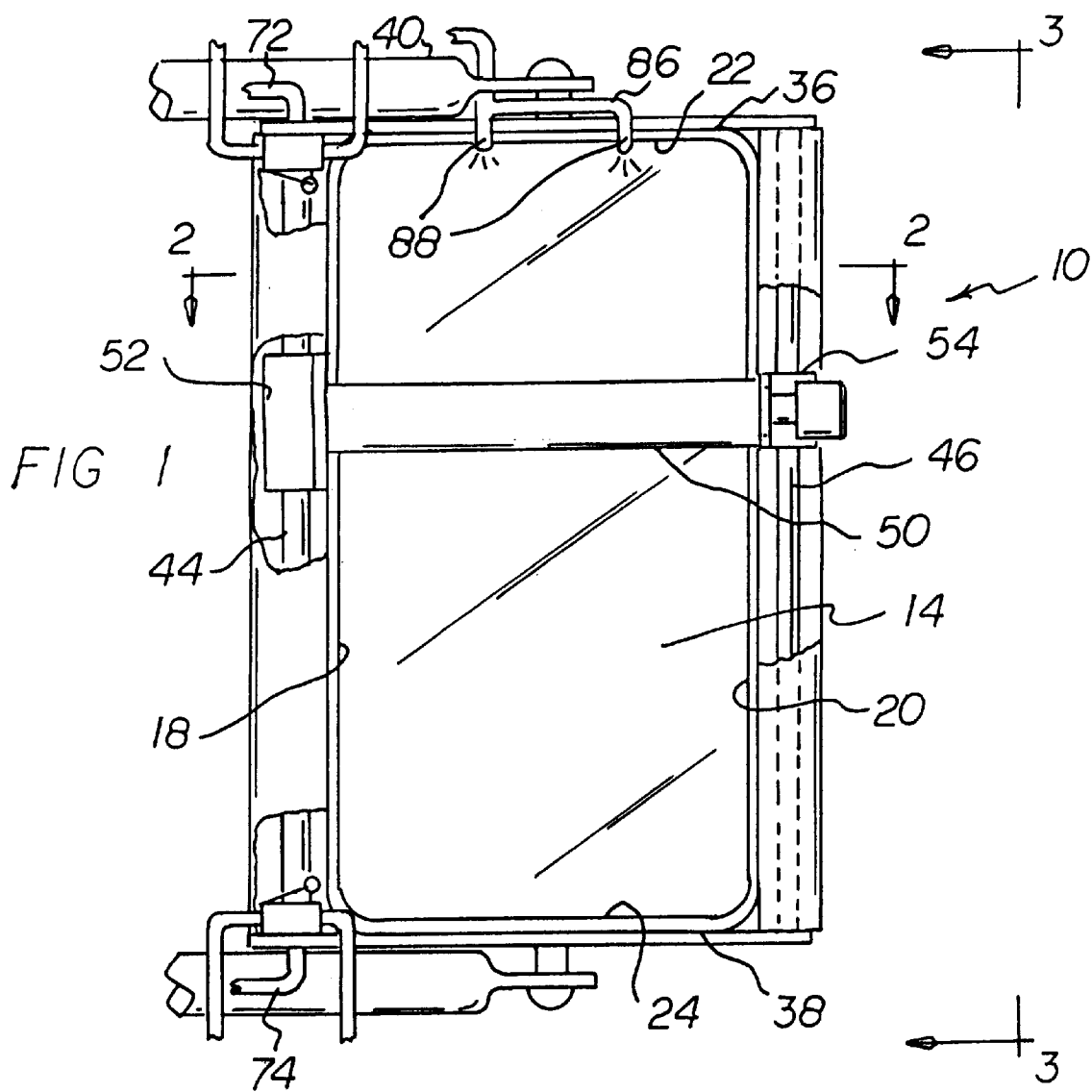
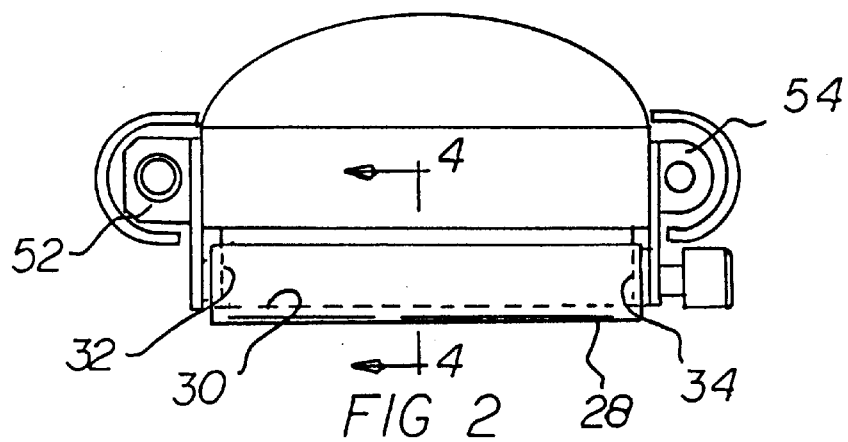

MIRROR CLEANING SYSTEM

BACKGROUND OF THE INVENTION

1. Field of the Invention

The present invention relates to a mirror cleaning system and more particularly pertains to cleaning and wiping mirrors of trucks and like vehicles in a superior fashion.

2. Description of the Prior Art

The use of mirror cleaning systems of known designs is known in the prior art. More specifically, mirror cleaning systems previously devised and utilized for the purpose of cleaning mirrors of trucks and like vehicles are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,410,774 to Adams discloses a portable window wiper. U.S. Pat. No. 5,362,119 to Rosenratter discloses a glare shield for a truck. U.S. Pat. No. 5,179,758 to Smith et al. discloses a wiper attachment for the rear view window of a truck, bus or similar vehicle. U.S. Pat. No. 5,150,497 to Preik disclos a truck mirror wiper. U.S. Pat. No. 4,763,381 to Williams discloses an accessory to keep outside rear view mirrors clear of water, snow, ice and dirt. U.S. Pat. No. 4,527,301 to Weitz discloses a side view mirror truck windshield wiper. U.S. Pat. No. 4,306,328 to Layton discloses a wiper apparatus for a side view mirror of a truck or the like. Lastly, U.S. Pat. No. 3,968,537 to Wagenhofer discloses a motorized wiping blade device for truck rear view mirrors.

While these devices fulfill their respective, particular objectives and requirements, the aforementioned patents do not describe a mirror cleaning system that allows cleaning and wiping mirrors of trucks and like vehicles in a superior fashion.

In this respect, the mirror cleaning system according to the present invention substantially departs from the conventional concepts and designs of the prior art, and in doing so provides an apparatus primarily developed for the purpose of cleaning and wiping mirrors of trucks and like vehicles in a superior fashion.

Therefore, it can be appreciated that there exists a continuing need for a new and improved mirror cleaning system which can be used for cleaning and wiping mirrors of trucks and like vehicles in a superior fashion. In this regard, the present invention substantially fulfills this need.

SUMMARY OF THE INVENTION

In view of the foregoing disadvantages inherent in the known types of mirror cleaning systems of known designs now present in the prior art, the present invention provides an improved mirror cleaning system. As such, the general purpose of the present invention, which will be described subsequently in greater detail, is to provide a new and improved mirror cleaning system and method which has all the advantages of the prior art and none of the disadvantages. To attain this the invention essentially comprises a mirror. The mirror has an exposed front surface. The mirror has long parallel vertically extending interior and exterior side edges and short horizontally extending top and bottom end edges. Next provided is a mirror support assembly. The mirror support assembly has extending top and bottom plates. The mirror is supported by the top and bottom plates of the mirror support assembly. Brackets are secured to the support assembly for coupling to a vehicle. A pair of vertically extending hollow, fiberglass pipes are provided. The pipes include an interior actuator and an exterior guide pipe. The pipes are secured with respect to the support assembly in proximity to the front surface of the mirror. Next provided is a cross piece. The cross piece has interior and exterior end blocks. The end blocks each have a vertical aperture slidably received on the pipes for reciprocal movement upwardly and downwardly along the pipes. The exterior end block is pivotable on the exterior tube for exchanging blades. Next provided are a plurality of wiper arms. The elongated wiper arm is formed of an elastomeric material. The wiper arm has a triangular cross-section selectively positionable to place a pre-selected apex of the triangular cross-section with each being in sliding contact with the front surface of the mirror for cleaning purposes during reciprocation of the cross piece. The selected wiper arm is supported along its length by complementary recesses of the cross piece. Two apexes of the wiper arm remote from the front surface of the mirror are received within the recesses of the cross piece. The selected wiper arm is replaceably positionable to allow any of the plurality of wiper arms to wipe the mirror during operation and use. The interior guide tube constitutes a magnetic rodless actuator with an internal magnet movable by air pressure for reciprocating the cross piece and wiper arm with respect to the front surface of the mirror. The interior actuator also includes an upper air line coupled to the upper end of the interior actuator. The interior actuator also includes a lower air line coupled to the lower end of the interior actuator and a source of pressurized air. A valve is also provided. In this manner the motion of the magnet is effected. Upper and lower sensors at the opposite ends of the interior actuator function to reverse the air valve and the direction of air flow from the supply lines and, thereby, the wiper. The source of pressurized air and valve are coupled by a controller. The controller has a plurality of positions including high, medium, low, intermittent and off. In this manner the movement of the wiper is controlled by an operator. A supplemental tube mounted above the mirror constitutes a manifold. A plurality of apertures are provided in the exterior guide tube for spraying a cleaning fluid on the mirror from a pressurized source through a fluid valve. A supply line at an end of the supplemental tube is provided for bringing a spray fluid from the source supply. A control button is provided and is under the control of an operator for activating the fluid valve to cause the spray.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mirror cleaning system which has all of the advantages of the prior art mirror cleaning systems of known designs and configurations and none of the disadvantages.

It is another object of the present invention to provide a new and improved mirror cleaning system which may be easily and efficiently manufactured and marketed.

It is further object of the present invention to provide a new and improved mirror cleaning system which is of durable and reliable constructions.

An even further object of the present invention is to provide a new and improved mirror cleaning system which is susceptible of a low cost of manufacture with regard to both materials and labor, and which accordingly is then susceptible of low prices of sale to the consuming public, thereby making such mirror cleaning system economically available to the buying public.

Even still another object of the present invention is to provide a mirror cleaning system for cleaning and wiping mirrors of trucks and like vehicles.

Lastly, it is an object of the present invention to provide a new and improved mirror cleaning system including a mirror with an exposed front surface and a mirror support assembly. A pair of vertically extending hollow, fiberglass pipes include an interior actuator and an exterior guide secured with respect to the support assembly. A cross piece has interior and exterior end blocks. Each block has a vertical aperture slidably received on the pipes for reciprocal movement upwardly and downwardly along the pipes. An elongated wiper arm of an elastomeric material is positioned in sliding contact with the front surface of the mirror during reciprocation of the cross piece. The interior actuator constitutes a magnetic rodless actuator with an internal magnet movable by air pressure for reciprocating the cross piece and wiper arm with respect to the front surface of the mirror. The interior actuator also includes an upper air line and a lower air line and a source of pressurized air and valve to effect the motion of the magnet. Upper and lower sensors at the opposite ends of the interior actuator function to reverse the air valve and the direction of air flow.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is front elevational view of the mirror cleaning system of the present invention.

FIG. 2 is a cross sectional view taken along line 2—2 of FIG. 1.

The same reference numerals refer to the same parts throughout the various Figures.

DESCRIPTION OF THE PREFERRED EMBODIMENT

Figure 3:
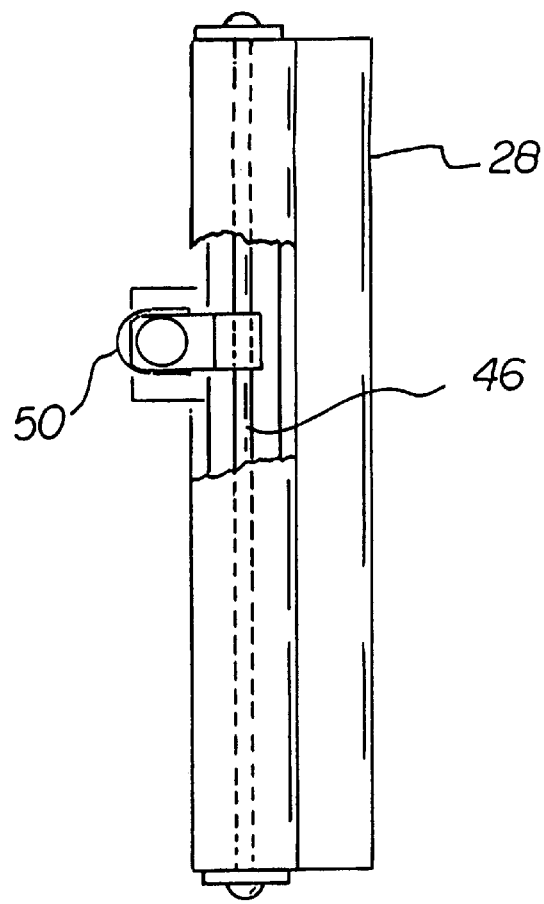
FIG. 3 is side elevational view taken along line 3—3 of FIG. 1.
Figure 4:
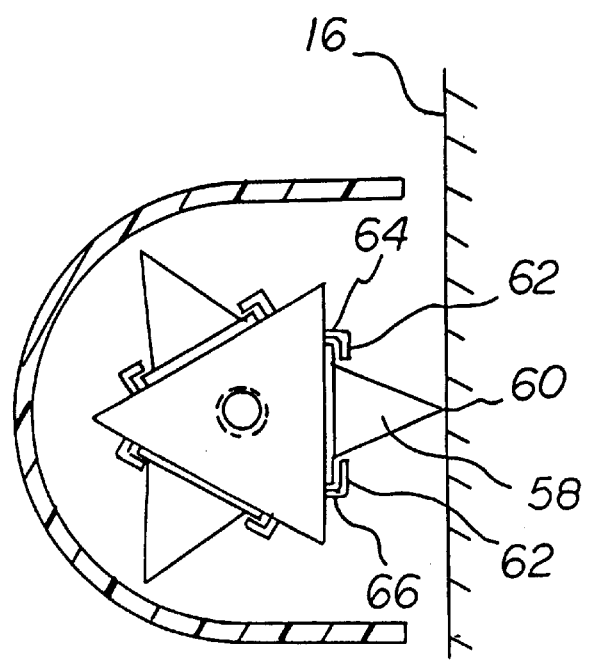
FIG. 4 is a cross-sectional view taken along line 4—4 of FIG. 2.
Figure 5:
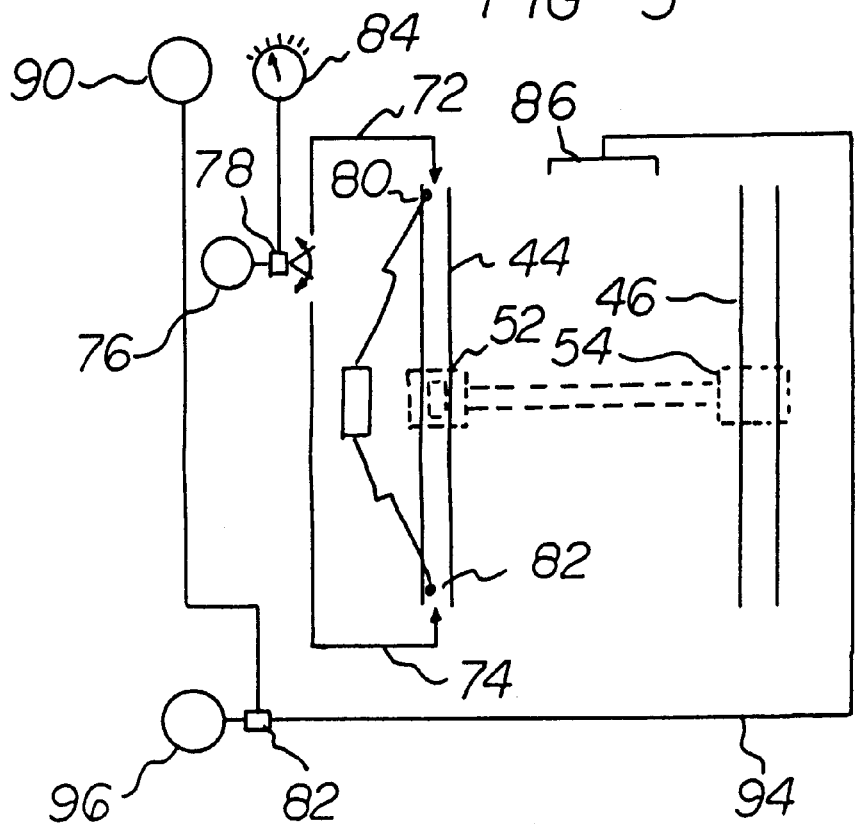
FIG. 5 is a schematic illustration of the system shown in the prior Figures.
Figure 6:
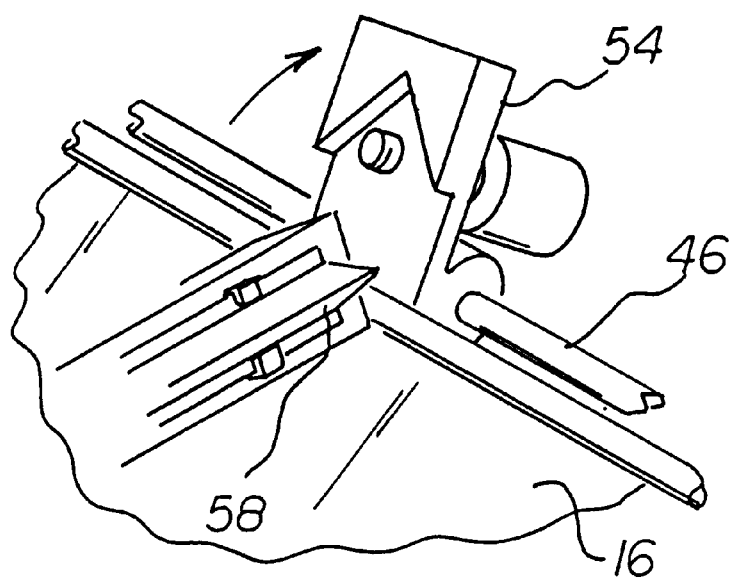
FIG. 6 is a perspective showing of the end of the blades with their pivotal support.

With reference now to the drawings, and in particular to FIG. 1 thereof, the preferred embodiment of the new and improved mirror cleaning system embodying the principles and concepts of the present invention and generally designated by the reference numeral 10 will be described.

The present invention, the mirror cleaning system 10 is comprised of a plurality of components. Such components in their broadest context include a mirror, a mirror support assembly, a pair of vertically extending hollow fiberglass pipes, a cross piece, and an elongated wiper arm. Such components are individually configured and correlated with respect to each other so as to attain the desired objective.

First provided is a mirror 14. The mirror has an exposed front surface 16. The mirror has long parallel vertically extending interior and exterior side edges 18, 20 and short horizontally extending top and bottom end edges 22, 24.

Next provided is a mirror support assembly 28. The mirror support assembly has horizontally extending top and bottom plates 36, 38. The mirror is supported by the top and bottom plates of the mirror support assembly. Brackets 40 are secured to the support assembly for coupling to a vehicle.

A pair of vertically extending hollow, fiberglass pipes are provided. Such tubes preferably have sliding surfaces as of Teflon. The guide pipes include an interior guide pipe 44 and an exterior guide pipe 46. The pipes are secured with respect to the support assembly in proximity to the front surface of the mirror. The interior guide pipe has actuator means coupled therewith.

Next provided is a cross piece 50. The cross piece has interior and exterior end blocks 52, 54. The end blocks are preferably metallic and responsive to follow the movement of a magnet. Each has a vertical aperture 56 slidably received on the pipes for reciprocal movement upwardly and downwardly along the pipes. The exterior end block is pivotable on the exterior tube. This allows for exchanging blades as needed.

Next provided is a plurality of elongated wiper arm 58, preferably three in number. The exterior end block is pivotable on the exterior tube. This allows for exchanging blades as needed. The elongated wiper arm is formed of an elastomeric material. The wiper arm has a triangular cross-section selectively positionable to place a pre-selected apex 60 of the triangular cross-section in sliding contact with the front surface of the mirror for cleaning purposes during reciprocation of the cross piece. The selected wiper arm is supported along its length by complementary recesses 62 of the cross piece. Two apexes 64, 66 of the wiper arm remote from the front surface of the mirror are received within the recesses of the cross piece. The wiper arm is replaceably positionable to allow any of the plurality of wiper blades to wipe the mirror during operation and use.

The actuator means constitutes a magnetic rodless actuator with an internal magnet movable by air pressure for reciprocating the cross piece and wiper arm with respect to the front surface of the mirror. The actuator means also includes an upper air line 72 coupled to the upper end of the interior guide pipe. The actuator means also includes a lower air line 74 coupled to the lower end of the interior guide pipe and a source 76 of pressurized air. A valve 78 is also provided. The valve is preferably a Series (N) VZ M550 commercially available. In this manner the motion of the magnet is effected. Upper and lower sensors 80, 82 at the opposite ends of the interior guide pipe function to reverse the air valve and the direction of air flow from the supply lines and, thereby, the wiper. The source of pressurized air and a valve are coupled by a controller 84. The controller has a plurality of positions including high, medium, low, intermittent and off. In this manner the movement of the wiper is controlled by an operator.

A supplemental tube 86 mounted above the mirror constitutes a manifold. A plurality of apertures 88 are provided in the supplemental tube for spraying a cleaning fluid on the mirror from a pressurized source 90 through a fluid valve 92. A supply line 94 at an end of the supplement tube is provided for bringing a spray fluid from the source supply. A control button 96 is provided and is under the control of an operator for activating the fluid valve to cause the spray.

When not in operation, the cross piece and wiper arms are at one end of the mirror, preferably the top, with no visual impairment so as not to encumber normal use of the mirror for maximum safety.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved mirror cleaning system for washing and wiping side view mirrors of trucks and like vehicles comprising, in combination:

a mirror having an exposed front surface with long parallel vertically extending interior and exterior side edges with short horizontally extending top and bottom end edges;

a mirror support assembly having horizontally extending top and bottom plates with the mirror supported by the top and bottom plates and with brackets secured to the support assembly for coupling to a vehicle;

a pair of vertically extending hollow, fiberglass pipes including an interior guide pipe and an exterior guide pipe secured with respect to the support assembly in proximity to the front surface of the mirror;

a cross piece with interior and exterior end blocks, each having a vertical aperture slidably received on the pipes for reciprocal movement upwardly and downwardly along the pipes, the exterior end block being pivotable on the exterior tube for exchanging blades;

a plurality of elongated wiper arms of an elastomeric material having a triangular cross-section with each being selectively positionable to place a pre-selected apex thereof in sliding contact with the front surface of the mirror for cleaning purposes during reciprocation of the cross piece, the selected wiper arm being supported along its length by complementary recesses of the cross piece with the two apexes of the wiper arm remote from the front surface of the mirror being received within the recesses of the cross piece, the wiper arm being replaceably positionable to allow any of the plurality of wiper arms to wipe the mirror during operation and use;

actuator means coupled with the interior guide pipe for moving the interior end block, the actuator means constituting a magnetic rodless actuator with an internal magnet mounted inside said interior guide pipe and movable by air pressure for reciprocating the cross piece and wiper arm with respect to the front surface of the mirror, the actuator means also including an upper air line coupled to the upper end of the interior guide pipe and a lower air line coupled to the lower end of the interior guide pipe and a source of pressurized air and valve to effect the motion of the magnet and with upper and lower sensors at the opposite ends of the interior guide pipe function to reverse the air valve and the direction of air flow from the supply lines and, thereby, the wiper arm, and with the source of pressurized air and valve being coupled by a controller with a plurality of positions including high, medium, low, intermittent and off, to control the movement of the wiper arm under the control of an operator; and a supplemental tube mounted above the mirror constituting a manifold with a plurality of apertures therein for spraying a cleaning fluid from a pressurized source onto the mirror through a fluid valve during cleaning and with a supply line at an end of the supplemental tube for bringing a spray fluid from the source supply with a control button associated therewith under the control of an operator for activating the fluid valve to cause the spray.

2. A mirror cleaning system comprising:

a mirror having an exposed front surface;

a mirror support assembly;

a pair of vertically extending hollow, fiberglass pipes including an interior guide pipe and an exterior guide pipe secured with respect to the support assembly;

a cross piece with interior and exterior end blocks, each having a vertical aperture slidably received on the pipes for reciprocal movement upwardly and downwardly along the pipes;

an elongated wiper arm of an elastomeric material coupled with said cross piece and in sliding contact with the front surface of the mirror during reciprocation of the cross piece;

actuator means coupled with the interior guide pipe for moving the interior block, the actuator means constituting a magnetic rodless actuator with an internal magnet mounted inside said interior guide pipe and movable by air pressure for reciprocating the cross piece and wiper arm with respect to the front surface of the mirror, the actuator means also including an upper air line and a lower air line and a source of pressurized air and valve to effect the motion of the magnet and with upper and lower sensors at the opposite ends of the interior guide pipe to reverse the air valve and the direction of air flow.

3. The system as set forth in claim 2 wherein the source of pressurized air and valve are coupled by a controller with a plurality of positions to control the movement of the wiper under the control of an operator.

4. The system as set in claim 2 and further including a supplemental tube mounted above the mirror constituting a manifold with a plurality of apertures therein for spraying a cleaning fluid from a pressurized source onto the mirror through a fluid valve during cleaning and with a supply line at an end of the supplemental tube for bringing a spray fluid from the source supply with a control button associated therewith under the control of an operator for activating the fluid valve to cause the spray.

* * * * *